United States Patent [19]

Lenzkes

[11] Patent Number: 5,695,178
[45] Date of Patent: Dec. 9, 1997

[54] SLIDING BLOCK FOR CLAMPING TOOLS

[75] Inventor: Thomas Lenzkes, Dublin, Ireland

[73] Assignee: Shanview Patents Limited, Dublin, Ireland

[21] Appl. No.: 565,300

[22] Filed: Nov. 27, 1995

[30] Foreign Application Priority Data

Dec. 1, 1994 [DE] Germany ............... 44 42 802.2

[51] Int. Cl.$^6$ .................................................. B23Q 3/02
[52] U.S. Cl. .................................. 269/99; 269/93; 269/94
[58] Field of Search ................... 269/91–94, 99–100, 269/81, 237, 238; 411/84, 85, 427

[56] References Cited

U.S. PATENT DOCUMENTS

| | | | |
|---|---|---|---|
| 1,820,667 | 8/1931 | Leyes | 269/93 |
| 2,372,716 | 4/1945 | Evans. | |
| 4,119,130 | 10/1978 | Berecz | 411/85 |
| 4,790,701 | 12/1988 | Baubles | 411/85 |
| 4,895,484 | 1/1990 | Wilcox | 411/85 |
| 4,907,923 | 3/1990 | McGrath | 411/85 |
| 5,199,836 | 4/1993 | Gogarty | 411/84 |

FOREIGN PATENT DOCUMENTS

| | | |
|---|---|---|
| 0391346 | 4/1990 | European Pat. Off. . |
| 0 613 757 | 1/1994 | European Pat. Off. . |
| 7314053 | 4/1973 | Germany . |
| 4244395 | 6/1994 | Germany . |
| 908566 | 2/1982 | U.S.S.R. . |

*Primary Examiner*—Robert C. Watson
*Attorney, Agent, or Firm*—Thomas, Kayden, Horstemeyer & Risley

[57] ABSTRACT

A sliding block (8) for securely clamping a clamping tool on an underlying surface, in particular a clamping table (7), which exhibits at least one T-slot shaped clearance (18), having a base (14) which may have a rectangular outline and a clamping plate (15) which exhibits a pair of anchorage continuations (16) which project with respect to the base (14) and are in a symmetrical arrangement. A threaded bore (12) is provided which passes through the base (14) and the clamping plate (15) and receives a fastening bolt (9). The clamping plate (15) has a further pair of anchorage continuations (17) and the base (14) and the clamping plate (15) with the two pairs of anchorage continuations are matched to two T-slot-shaped clearances (18, 19) of different geometry. The two pairs of anchorage continuations (16, 17) on the clamping plate (15) are, with respect to the axis (13) of the threaded bore (12), turned through an angle of 90° with respect to one another.

8 Claims, 3 Drawing Sheets

SLIDING BLOCK FOR CLAMPING TOOLS

FIELD OF THE INVENTION

The invention relates to a sliding block for securely clamping a clamping tool on an underlying surface, in particular a clamping table, which exhibits at least one T-slot-shaped clearance, having a base and a clamping plate which exhibits a pair of anchorage continuations which project with respect to the base and are in a symmetrical arrangement, and having a threaded bore which passes through the base and the clamping plate and is intended for receiving a fastening bolt. Such sliding blocks may form a constituent part of a device for securely clamping a workpiece on a clamping table. They serve for securely clamping the clamping device on the underlying surface, in particular the clamping table. The clamping table has corresponding T-slot-shaped clearances running through it, the geometry of the sliding block being matched to the geometry of the T-slot-shaped clearances of the clamping table. However, the sliding block may also be used in a different manner for clamping purposes. The invention may also be realized for a T-bolt, that is to say for a bolt whose head is of a corresponding design and engages into the T-slot-shaped clearance. The invention thus relates, in general, to a fastening element for engagement into a slot, although it is explained hereinbelow using the example of the sliding block.

BACKGROUND OF THE INVENTION

Known sliding blocks exhibit a basic body which is penetrated by a threaded bore which is intended for receiving a fastening bolt. The basic body has a base which widens into anchorage continuations which are arranged in a lower region and engage into the bottom of the T-slot-shaped clearance while the base comes to rest between the border regions of the slot, that is to say the slot neck. The T-slot-shaped clearances are of different geometry, in particular of different sizes, the neck width of the T-slot-shaped clearance and the width of the slot in the slot bottom relating to one another in a specific manner. However, for T-slot-shaped clearances of different sizes, different sliding blocks are also required, the latter being matched with respect to one another in terms of the design of the base, that is to say of the base width and of the width of the anchorage continuations.

A sliding block of the type described in the introduction is known from EP 0 391 346 B1. It is used in conjunction with a clamping device for securely clamping a workpiece. The sliding block has a base which, as a rule, secures the sliding block from rotating in the slot neck. Provided beneath the base is a clamping plate which projects with respect to the base at two opposite locations and thus forms a pair of anchorage continuations. Said anchorage continuations engage into the bottom of the T-slot-shaped clearance in the underlying surface, in particular in a clamping table. Said known sliding block can be used only for a T-slot-shaped clearance of fixed corrresponding geometry. If a workpiece is intended to be clamped, for example, on another clamping table which has T-slot-shaped clearances of a different geometry, the present sliding block cannot be used and has to be replaced by a sliding block of the other dimensions. It is thus conventional that, during machining of workpieces, in particular on material-removing machine tools, various sets of sliding blocks of different geometrical design have to be kept in stock for optional use. The degree of outlay and storage follow correspondingly. In addition, the changeover of the clamping tools takes time.

SUMMARY OF THE INVENTION

The object of the invention is to provide a sliding block of the type described in the introduction which can fulfill its function in a plurality of T-slot-shaped clearances, at least in two such clearances. A sliding block by means of which certain size ranges of T-slot-shaped clearances can be provided for is thus intended to be provided.

According to the invention, this is achieved for a sliding block of the type described in the introduction in that the clamping plate exhibits a further pair of anchorage contintuations, and in that the base and the clamping plate with the two pairs of anchorage continuations are matched to two T-slot-shaped clearances of different geometry.

The invention is based on the idea of designing the clamping plate differently along its periphery and thereby realizing at least one further pair of anchorage continuations which differ from the first pair of anchorage continuations in terms of their geometrical dimensions, with the result that the sliding block can optionally be inserted into one T-slot-shaped clearance or the other. Of course, not all T-shaped clearances can be provided for by means of said novel sliding block however, a number of—at least two— clearances can be spanned by said sliding block, with the result that the number of sliding blocks to be kept in stock is already halved by this extremely simple embodiment. Of course, the idea may be greatly expanded, this then resulting—at least in certain areas—in a universal sliding block which is capable of covering T-shaped clearances in a certain range.

In particular, the base may have a rectangular outline, the two pairs of anchorage continuations on the anchorage plate being provided, with respect to the axis of the threaded bore, such that they are turned through an angle of 90° with respect to one another. Consequently, the base may also serve in both application cases as a means for securing against rotation, and the full load-bearing capacity of the sliding block is given in both relative positions.

The clamping plate may also, however, exhibit peripheral regions which widen radially, with respect to the axis, counter to the tightening direction of the fastening bolt. This thus provides a universal sliding block which can be used over a certain size range of slots. This sliding block may have the advantage that it can also be inserted, at least into some of the appropriate slots, from above, with the result that it is not necessary, in the case of particularly long slots, to push the sliding block in laterally and advance it up to the fastening location. Upon tightening the fastening bolt, a certain automatic action is achieved, as it were. As long as the sliding block, with its threaded bore, is in exclusive contact with the fastening bolt, this adherence is sufficient to position the sliding block in the groove, during tightening of the fastening bolt, in any case until its corresponding regions come to rest laterally on the bottom of the slot. This is, at the same time, the most expedient anchorage position for the sliding block, and the secure fit is achieved upon further tightening of the fastening bolt. Conversely, the sliding block is released by the fastening bolt being rotated the other way, that is to say in the loosening direction. In this arrangement too, the sliding block is carried along again after release.

The base of sliding block may have a round outline, in order to ensure in each case that the anchorage continuations come to rest laterally on the bottom of the T-shaped clearance. Moreover, this simplifies the production of the sliding block.

It is particularly advantageous if one of the two pairs of anchorage continuations is adapted to the geometry of a T-slot-shaped clearance of a guide shoe of a device for securely clamping a workpiece. This then results in the particular advantage that it is not only possible with such a clamping device to be securely clamped on the underlying surface, for example the clamping table, by means of its clamping shoe, but there is also the possibility of stacking a plurality of guide shoes one on top of the other and securely clamping them with respect to one another, with the result that this thus achieves, in a simple manner, the possibility of matching to the height of a workpiece the clamping height of the device for securely clamping said workpiece. In this case, the geometrical dimensions of the two pairs of anchorage continuations can have values which are relatively far apart, i.e. they differ considerably, because the T-shaped clearances in a clamping table are usually of smaller dimensions than the T-shaped clearance in a guide shoe.

The guide shoe exhibits mutually parallel mounting surfaces, with the result that the guide shoes can be securely clamped directly one above the other.

The guide shoe exhibits at least one T-slot-shaped clearance. It may, however, also have two or even more such T-slot-shaped clearances.

BRIEF DESCRIPTION OF THE DRAWINGS

The invention is further explained and described with reference to preferred exemplary embodiments. In the drawing.

DETAILED DESCRIPTION

Figure 1:
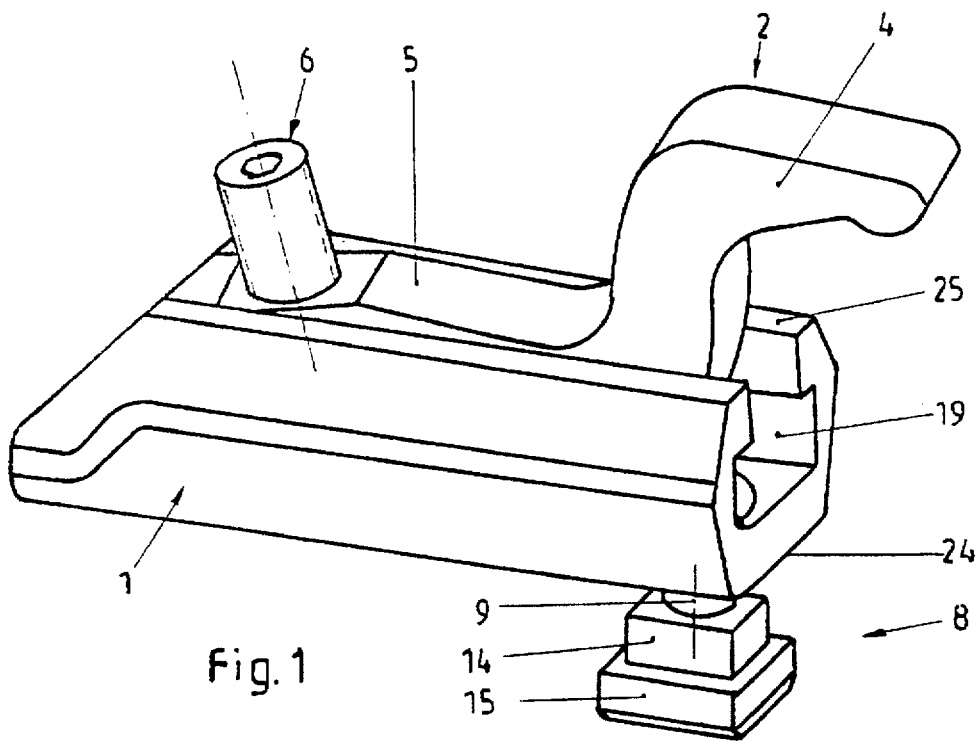
FIG. 1 shows a perspective representation of a device for securely clamping the workpiece on an underlying surface.

A device for securely clamping a workpiece on an underlying surface is represented in perspective in FIG. 1. As essential elements, the clamping device exhibits a guide shoe 1 and a clamping lever 2. The clamping lever 2 is designed in the manner of a tilting lever and is mounted on a bearing plate 3 (FIG. 6) such that it can be pivoted approximately in its central region. The clamping lever 2 exhibits a bracing leg 4 by means of which the workpiece is securely clamped on the underlying surface, for example the clamping table. Otherwise, the clamping lever 2 has, as seen towards the rear from its bearing, a clamping leg 5, of which the free end is penetrated by a clamping bolt 6 which, in the clamping position, is supported on the bearing plate 3. Tightening the clamping bolt 6 effects the secure clamping of the workpiece in that the clamping lever 2 is pivoted about its centrally arranged bearing.

In order to fasten the guide shoe 1 of the device on an underlying surface, for example a clamping table 7 (FIG. 6), use is made of a sliding block 8 which is assigned a fastening bolt 9 which passes through a correspondingly configured bore 10 in the region of the floor 11 of the guide shoe 1 and is supported there on a conical surface. The fastening bolt 9 engages into a threaded bore 12 in the sliding block 8. The threaded bore 12 may pass all the way through the sliding block 8, but it may also be designed as a blind bore.

Figure 2:
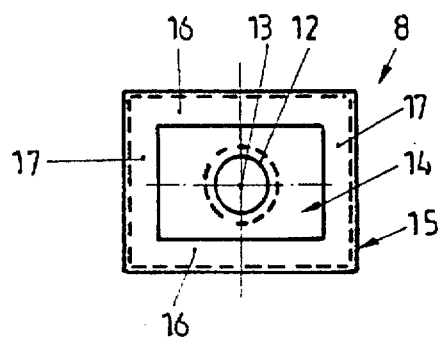
FIG. 2 shows a plan view of a first embodiment of a sliding block.
Figure 6:
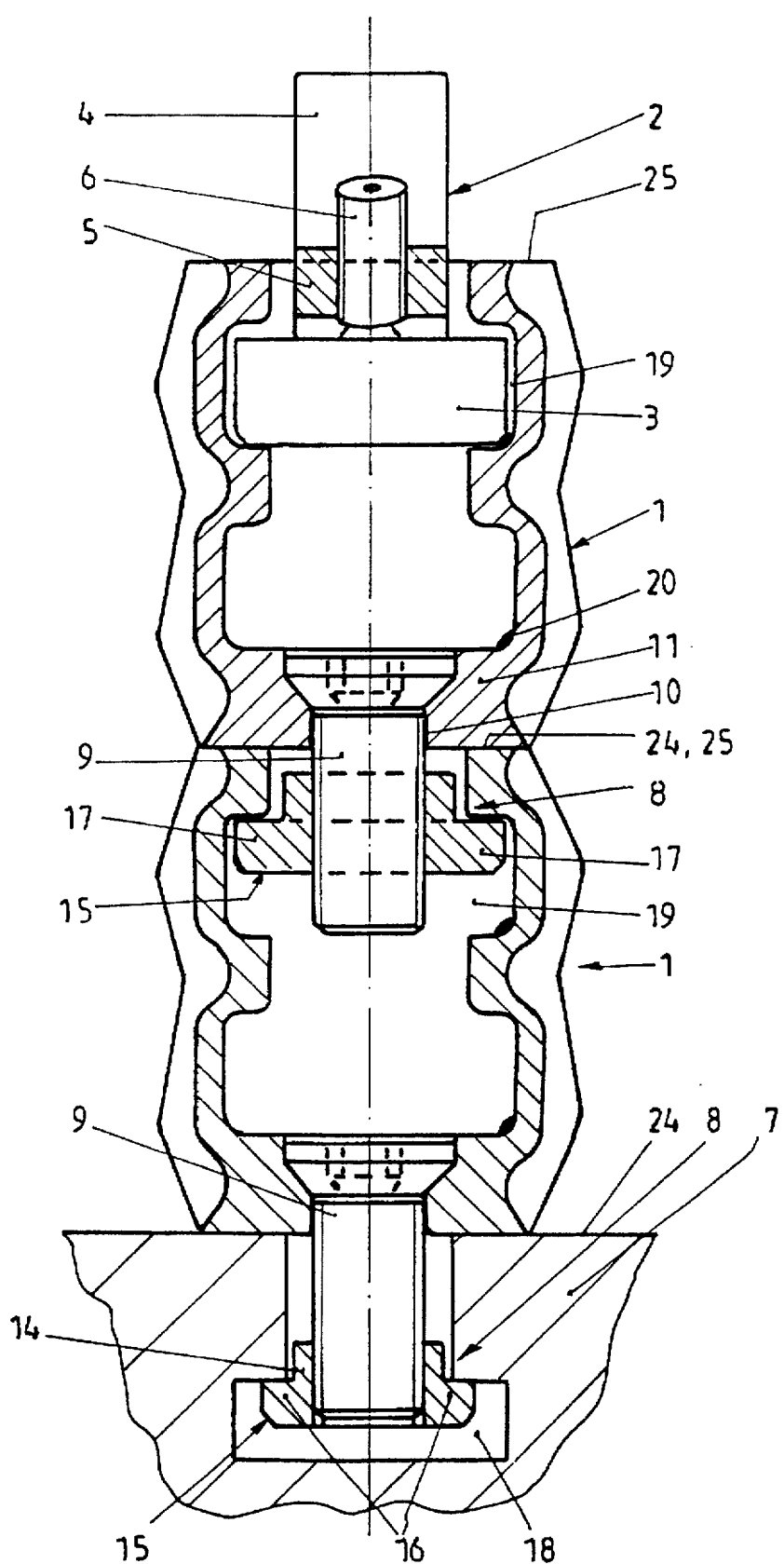
FIG 6 shows an end view of two guide shoes securely clamped, one above the other, on a clamping table.
Figure 7:
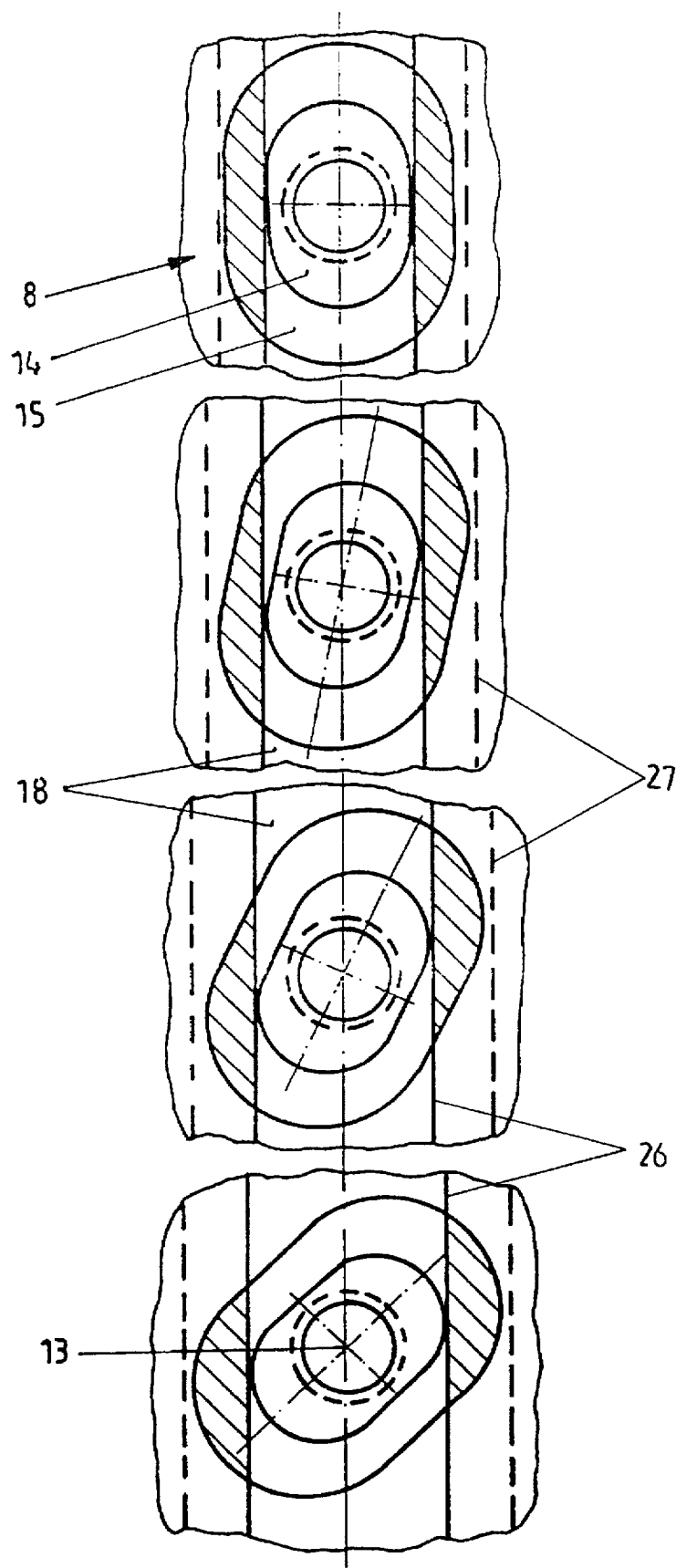
FIG. 7 shows various plan views of a further sliding block, in each case inserted into slots of different widths.

The sliding block 8 has the threaded bore 12 arranged in it centrally with respect to its vertical axis 13. Provided in its upper region is a base 14 which is rectangular in the embodiment of FIGS. 1 and 2. A clamping plate 15 is located beneath the base 14. The base or shank portion 14 and the clamping plate 15 are designed in one piece. The clamping plate 15 also has a rectangular outline in the embodiment of FIGS. 1 and 2 and forms a first pair of anchorage continuations or anchoring projections 16 with respect to the base which provide a first pair of opposed anchoring surfaces. However, the clamping plate 15 projects with respect to the base 14 not only in these two opposed directions, but also at a location turned through 90° about the axis 13. There, a second pair of anchorage continuations or anchoring projections 17 is formed which provide a second pair of opposed anchoring surfaces. The two pairs of anchorage continuations 16 and 17 have different geometrical dimensions, with the result that the sliding block 8 can be inserted into an inverted T-slot-shaped clearance or T-shaped slot, in one arrangement, in its longitudinal direction and, in another arrangement, in its transverse direction, turned through 90°. In either case, the base or shank portion 14 fits between the sides of an upper narrow channel 26 of the slot and the clamping plate portion 15 fits between the sides of a lower wide channel 27 of the slot as depicted in FIG. 7. The exemplary embodiment of FIGS. 1 and 2 is to be seen in conjunction with the representation of FIG. 6. The clamping table 7 exhibits a T-slot-shaped clearance 18 into which the sliding block 8 is inserted such that the pair of anchorage continuations 16 can be inserted corresponding to the design of the clearance 18 and fulfills its function by abutting the internal upper flat surfaces 28 of the slot. By tightening the lower fastening bolt 9, a guide shoe 1 is securely clamped on the clamping table 7. FIG. 6, however, shows a further guide shoe 1 which is of identical design, is mounted on the securely clamped guide shoe 1 and is likewise securely clamped. The sliding block 8 with its fastening bolt 9 is used for this purpose. This sliding block 8 is inserted, in a state rotated through 90°, into an (upper) T-slot-shaped clearance 19 in the lower guide shoe 1, with the result that the pair of anchorage continuations 17 of the sliding block 8 fulfill their function here. The bearing plate 3 with the clamping lever 2 is pushed into the upper T-slot-shaped clearance 19 of the upper guide shoe 1, with its front end, in which it can securely clamp a relatively high workpiece which is bearing on the surface of the clamping table 7. Whereas FIG. 6 shows, as it were, a two-story design of the guide shoe 1, it is just as easily imaginable that a plurality of guide shoes 1 according to FIG. 1, that is to say of a single-story design, could be securely clamped one on top of the other. In order to restrict the sliding-out movement of the bearing plate 3 in a forward direction, that is to say in the direction of the workpiece which is to be clamped, a weld spot 20 or some other obstacle may be provided in the front region of the clearance 19.

Figure 3:
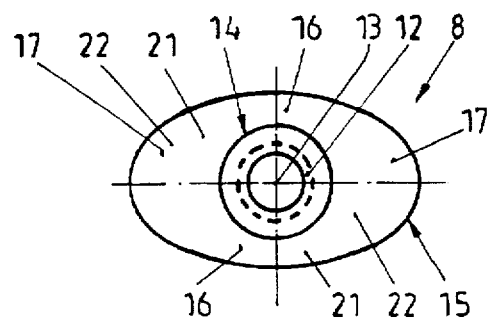
FIG. 3 shows a plan view of a second embodiment of the sliding block.

Whereas the embodiment of the sliding block 8 according to FIGS. 1, 2 and 6 is rectangular both in the region of the clamping plate 15 and the region of the base 14, FIG. 3 shows an embodiment in which the base 14 is circular and the clamping plate 15 is elliptical, with the result that, in the region of the clamping plate 15, the first pair of anchorage continuations 16 are designed and arranged in accordance with the small semiaxis of the ellipse and the other pair of anchorage continuations 17 are designed and arranged corresponding to the large semiaxis. Further pairs of anchorage continuations 21 and 22 are located, as it were, in a stepless manner in the transition region between the first and second pairs of anchorage continuations.

Figure 4:
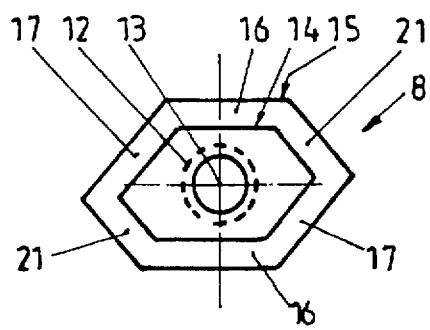
FIG. 4 shows a plan view of a further embodiment of the sliding block.

The embodiment of the sliding block according to FIG. 4 is based on a hexagonal outline of the base 14 and of the clampling plate 15. Three pairs of anchorage continuations 16, 17, 21 are thus provided here, with the result that said sliding block 8 can be inserted into at least three differently dimensioned clearances 18 and 19.

Figure 5:
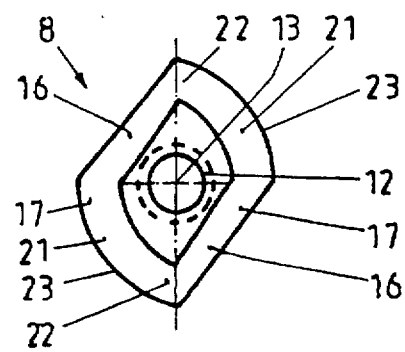
FIG. 5 shows a plan view of a further embodiment of the sliding block.

Similarly to the embodiment of FIG. 3, the sliding block 8 according to FIG. 5 again constitutes a universal sliding block. This has peripheral regions 23 which widen radially, with respect to its axis 13, counter to the tightening direction of the fastening bolt 9, with the result that a plurality of pairs of anchorage continuations 16, 17, 21, 22 are formed here one after the other. A stepless transition, as it were, is provided here. Such a sliding block 8 may also be inserted, at least into some of the clearances, from above and, by rotation of the fastening bolt 9, can be carried along about its axis 13 such that, depending on the width of the clearance 18 or 19 in the slot base, the clamping plate 15 and/or the base 14—in the case of corresponding, similar configurations—come/comes into abutment. In this manner, gripping takes place behind the neck of the clearance 18, 19 and the anchorage continuations can fulfill their task. The guide shoe 1 exhibits parallel mounting surfaces 24 and 25.

FIG. 7 shows a further sliding block 8 in conjunction with slots of different widths. The sliding block 8 has an elliptically rounded-off base 14 and a clamping plate 15 which is of similar shaping and projects beyond the periphery of the base 14. Upon insertion and clamping into clearances 18 of different widths, it is the base 14 which comes into abutment against the side walls of the slots and thus restricts the rotary anchorage movement. It can be seen that this sliding block can be used for a whole series of slots of different widths in a certain width range. For clarification purposes, the mutually overlapping surfaces on which force transmission takes place are highlighted by hatching.

LIST OF REFERENCE NUMERALS

1—Guide shoe
2—Clamping lever
3—Bearing plate
4—Bracing leg
5—Clamping leg
6—Clamping bolt
7—Clamping table
8—Sliding block
9—Fastening bolt
10—Bore
11—Floor
12—Threaded bore
13—Axis
14—Base
15—Clamping plate
16—Anchorage continuation
17—Anchorage continuation
18—Clearance
19—Clearance
20—Weld point
21—Anchorage continuation
22—Anchorage continuation
23—Peripheral region
24—Mounting surface
25—Mounting surface

I claim:

1. A sliding block for securely clamping a clamping tool to a work surface, the work surface having an inverted T-shaped slot provided therein, the slot having an upper narrow channel and a lower wide channel, and further having internal upper flat surfaces extending outwardly from opposing sides of the upper narrow channel to opposing sides of the lower wide channel, the sliding block being a one-piece, integral, and solid member having an upper relatively small shank portion dimensioned to freely slide within the upper narrow channel and a lower relatively large clamping plate portion having a breadth larger than the breadth of the upper narrow channel and dimensioned to freely slide within the lower wide channel, a threaded bore provided through the shank portion and clamping plate portion for receiving a fastening bolt, wherein the improved sliding block further comprises:

a first pair of opposed anchoring projections formed by the clamping plate portion and extending outwardly from the shank portion, the first pair of anchoring projections forming a first pair of opposed anchoring surfaces for engaging the internal upper flat surfaces of the inverted T-shaped slot; and a second pair of opposed anchoring projections formed by the clamping plate portion and extending outwardly from the shank portion in a direction at a right angle with the first pair of opposed anchoring projections, the second pair of opposed anchoring projections forming a second pair of anchoring surfaces for engaging the internal upper flat surfaces of the inverted T-shaped slot;

the shank portion including a plurality of right-angled corners which together form the outline of a rectangle;

the sliding block being capable of being inserted into the inverted T-shaped slot of the work surface, placed in the desired position along the length of the inverted T-shaped slot, and tightened against the work surface with the fastening bolt such that at least one of said pair of anchoring surfaces engages the internal upper flat surfaces of the T-shaped slot and either or both of the shank portion and the clamping plate portion is capable of limiting rotation of the sliding block within the T-shaped slot by abutting the either or both of the opposing sides of the upper narrow channel and the lower wide channel respectively.

2. The sliding block according to claim 1, wherein the first pair of anchoring surfaces are spaced further apart than the second pair of anchoring surfaces so that the block may be inserted either longitudinally into a relatively narrow inverted T-shaped slot or transversely into a relatively wide inverted T-shaped slot.

3. The sliding block according to claim 2, wherein the clamping plate portion has a plurality of right-angled corners which together form the outline of a rectangle.

4. The sliding block according to claim 3, wherein the first pair of opposed anchoring projections and the second pair of opposed anchoring projections are formed integrally with one another, together providing a continuous anchoring surface which completely surrounds the entire shank portion so that the block may be used with variously sized inverted T-shaped slots, the sliding block being rotated within the inverted T-shaped slot during tightening of the fastening bolt until right-angled corners of one or both of the shank portion and the clamping plate portion abut the opposing sides of one or both of the upper narrow channel and the lower wide channel respectively, the right-angled corners thereby limiting rotation of the sliding block to ensure proper alignment of the sliding block and adequate contact area between the continuous anchoring surface and the internal upper flat surfaces of the inverted T-shaped slot.

5. The sliding block according to claim 4, wherein the sliding block is symmetrical about a vertical plane which divides the block into equal halves.

6. The sliding block according to claim 1, wherein the clamping plate portion has right-angled corners which together form the outline of a rectangle.

7. The sliding block according to claim 6, wherein the sliding block is symmetrical about a vertical plane which divides the block into equal halves.

8. A sliding block for securely clamping a clamping tool to a work surface, the work surface having an inverted T-shaped slot provided therein, the slot having an upper narrow channel and a lower wide channel, and further having internal upper flat surfaces extending outwardly from opposing sides of the upper narrow channel to opposing sides of the lower wide channel, the sliding block being a one-piece, integral, and solid member having a length dimension which is greater than its width dimension, the sliding block further having an upper relatively small shank portion dimensioned to freely slide within the upper narrow channel and a lower relatively large clamping plate portion having a breadth larger than the breadth of the upper narrow channel and dimensioned to freely slide within the lower wide channel, a threaded bore provided through the shank portion and clamping plate portion for receiving a fastening bolt, wherein the improved sliding block further comprises:

an anchoring projection formed by the clamping plate portion and extending radially outwardly from the shank portion providing a continuous anchoring surface for engaging the internal upper flat surfaces of the slot, the continuous anchoring surface completely surrounding the entire shank portion;

the shank portion including a plurality of right-angled corners which together form the outline of a rectangle; the clamping plate portion including a plurality of right-angled corners which together form the outline of a rectangle;

the sliding block being capable of being inserted into the inverted T-shaped slot of the work surface either longitudinally into a relatively narrow T-shaped slot or transversely into a relatively wide T-shaped slot and tightened in a desired position along the length of the T-shaped slot with the fastening bolt, the sliding block rotating within the T-shaped slot during tightening of the fastening bolt until right-angle corners of one or both of the shank portion and the clamping plate portion abut the opposing sides of one or both of the upper narrow channel and the lower wide channel respectively, the corners thereby limiting rotation of the sliding block to ensure proper alignment of the sliding block within the slot so that an adequate contact area is maintained between the anchoring surface and the internal upper flat surfaces of the inverted T-shaped slot.

* * * * *